US012656564B2

(12) United States Patent
Sutehall et al.

(10) Patent No.: US 12,656,564 B2
(45) Date of Patent: Jun. 16, 2026

(54) OPTICAL FIBRE UNIT FOR AIR-BLOWN INSTALLATION

(71) Applicant: PRYSMIAN S.p.A., Milan (IT)

(72) Inventors: Ralph Sutehall, Aberbeeg (GB);
Susanna Santamaria, Chandler's Ford
(GB); Daniel Shell, Eastleigh (GB);
George Stephen Lucas, Southampton
(GB)

(73) Assignee: PRYSMIAN S.p.A., Milan (IT)

( * ) Notice: Subject to any disclaimer, the term of this
patent is extended or adjusted under 35
U.S.C. 154(b) by 0 days.

(21) Appl. No.: 17/940,953

(22) Filed: Sep. 8, 2022

(65) Prior Publication Data

US 2023/0079855 A1 Mar. 16, 2023

(30) Foreign Application Priority Data

Sep. 9, 2021 (IT) ......................... 102021000023267

(51) Int. Cl.
*G02B 6/44* (2006.01)
*G02B 6/52* (2006.01)
(52) U.S. Cl.
CPC ........... *G02B 6/4438* (2013.01); *G02B 6/441*
(2013.01); *G02B 6/4432* (2013.01); *G02B*
*6/44384* (2023.05); *G02B 6/52* (2013.01)
(58) Field of Classification Search
CPC ...... G02B 6/52; G02B 6/44384; G02B 6/441;
G02B 6/4432
USPC ....................................................... 385/100
See application file for complete search history.

(56) References Cited

U.S. PATENT DOCUMENTS

| | | | | |
|---|---|---|---|---|
| 5,148,509 A | * | 9/1992 | Kannabiran ......... | G02B 6/4432 |
| | | | | 385/113 |
| 10,782,496 B1 | * | 9/2020 | Risch .................... | G02B 6/4429 |
| 2001/0019649 A1 | * | 9/2001 | Field .................... | G02B 6/4433 |
| | | | | 385/100 |
| 2004/0037522 A1 | * | 2/2004 | Sutehall .............. | G02B 6/4429 |
| | | | | 385/113 |
| 2006/0140556 A1 | * | 6/2006 | Brown ................. | G02B 6/4438 |
| | | | | 385/100 |
| 2016/0274324 A1 | * | 9/2016 | Sutehall .............. | G02B 6/4433 |

FOREIGN PATENT DOCUMENTS

| | | |
|---|---|---|
| EP | 1600802 A2 | 11/2005 |
| EP | 3715926 A1 | 9/2020 |
| WO | 2002/012943 A1 | 2/2002 |

OTHER PUBLICATIONS

"Plastics—Determination of Tensile Properties—Part 1: General
Principles", ISO 527-1:2012(E), Feb. 15, 2012, 28 pages.

(Continued)

*Primary Examiner* — Jerry M Blevins
(74) *Attorney, Agent, or Firm* — Seed IP Law Group LLP

(57) ABSTRACT

It is disclosed an optical fibre unit for air-blown installations
comprising: a first group of optical fibres embedded in a
resin layer; a sheath arranged in a radially outer position
with respect to the resin layer so that an annular space is
formed between resin layer and sheath; and a second group
of optical fibres arranged in the annular space. Also dis-
closed are an apparatus and a method for manufacturing
such optical fibre unit.

18 Claims, 2 Drawing Sheets

(56)        References Cited

OTHER PUBLICATIONS

"Plastics and Ebonite—Determination of Indentation Hardness by means of a Durometer (Shore Hardness)", ISO 868:2003(E), Mar. 1, 2003, 10 pages.
"Plastics—Methods for Determining the Density of Non-Cellular Plastics—Part 1: Immersion Method, Liquid Pyknometer Method and Titration Method", 1801183-1:2004(E), Feb. 1, 2004, 14 pages.

* cited by examiner

OPTICAL FIBRE UNIT FOR AIR-BLOWN INSTALLATION

BACKGROUND

The present disclosure relates to optical fibre units for air-blown installations. In particular, the present disclosure relates to an optical fibre unit for air-blown installation, having a high fibre density. The present disclosure also relates to a method and apparatus for manufacturing such an optical fibre unit.

STATE OF THE ART

Fibre optic cables have been commonly deployed by installing them in ducts by blowing or pulling, burying them in the ground, or suspending them between above-ground poles.

One method of installing an optical fibre cable in a duct comprises blowing the cable into the duct using gaseous flow which is fed into an inlet end of the duct together with the cable. The length of cable which can be blown into the duct can be increased by applying an additional pushing force to the cable at the inlet end of the duct. Optical fibre cables for blown installation do not have to withstand high tensile loads (unlike cables which are to be pulled through ducting) but they do require a degree of stiffness for the application of the pushing force.

Microducts are empty tubes that can be blown, pulled or pushed into empty or partially filled standard ducts. Optical fibre units, specifically designed for this kind of application, are then installed as needed inside the microduct tubes by blown installation techniques.

WO 2002/012943 discloses an optical fibre cable for blown installation having a core comprising at least one tube stranded about a central strength member and at least one optical fibre loosely housed in said at least one tube, and a jacket surrounding said core, wherein said central strength member is tubular, said central strength member having a peripheral wall enclosing a passage extending along the length of said central strength member. At least one tube member loosely housing at least one optical fibre may be accommodated within said passage of the central strength member.

US 2016/0274324 discloses an optical fibre unit for air-blown installation comprising a number of optical conductors, a first layer of resin material, a second layer of resin material radially outer to the first layer of resin material and a sheath of thermoplastic material over and in close contact with the first layer of resin material. The optical conductors are completely embedded in the first resin layer.

SUMMARY

The optical fibre unit of US 2016/0274324, wherein the optical fibres are completely embedded in a resin matrix, generally provides good blowing performance.

Recently, the need for optical fibre units for air-blown installation with fibre counts of 24 or more has emerged from the network operators. However, the maximum number of optical fibres that may be put in an optical fibre unit such as that of US 2016/0274324 is typically 12. A higher number of optical fibres embedded in the first resin layer would result in an increased stiffness of the optical fibre unit and, hence, in a worsening of its blowing performance (e.g., making it harder to go around bends).

On the other hand, a cable construction as that of WO 2002/012943, wherein the optical fibres are loosely arranged in tubes stranded about a tubular strength member, exhibits both a high fibre count and a suitable stiffness. However, it typically has a large outer diameter, which may be unsuitable for some cabling application.

The Applicant has then faced the problem of providing an optical fibre unit for air-blown installation which overcomes the aforesaid drawbacks.

For example, the Applicant has tackled the problem of providing an optical fibre unit for air-blown installation which exhibits both good blowing properties (suitability to be installed by blowing) and a high fibre density, where "fibre density" indicates the ratio between the fibre count of the optical fibre unit (namely, the number of optical fibres comprised in the optical fibre unit) and the outer diameter of the optical fibre unit.

According to embodiments of the present disclosure, this problem, among others, is solved by an optical fibre unit for air-blown installation comprising a first group of optical fibres, a resin layer substantially completely embedding the first group of optical fibres, a sheath arranged in a radially outer position with respect to the resin layer so that an annular space is formed between resin layer and sheath, and a second group of optical fibres arranged in such annular space.

This construction of the optical fibre unit allows to increase the fibre density, while preserving the blowing properties of the optical fibre unit. Given a certain fibre count requested by the network operator, indeed, such fibre count may be suitably distributed between the first group and second group of optical fibres. For example, the number of optical fibres in the first group may be kept below or equal to a maximum value (e.g. 12) which guarantees that the central element formed by first group of optical fibres and resin layer, and, hence, the whole optical fibre unit, exhibits a stiffness adequate for blowing installation.

The rest of the requested fibre count is instead arranged about the resin layer, namely in the annular space between resin layer and sheath, thereby forming the second group of optical fibres. This arrangement of the second group of optical fibres can be very compact and result in a reduced overall outer diameter of the optical fibre unit. As it will be discussed in detail herein below as an example, the Applicant has estimated that an overall fibre count of 36, including 12 fibres of the first group and 24 fibres of the second group, may be obtained with an overall diameter of the optical fibre unit of no more than 2.0 mm.

Therefore, according to a first aspect, the present disclosure provides an optical fibre unit for air-blown installation comprising:
   a first group of optical fibres;
   a resin layer substantially completely embedding the first group of optical fibres;
   a sheath arranged in a radially outer position with respect to the resin layer so that an annular space is formed between resin layer and sheath; and
   a second group of optical fibres arranged in the annular space.

In an embodiment, the second group of optical fibres is arranged about the resin layer in at least one layer substantially coaxial with the resin layer itself.

In an embodiment, the optical fibres of the second group are stranded or oscillated (SZ laid) about the resin layer.

In an embodiment, the optical fibres of the second group are laid about the resin layer substantial parallel to the longitudinal axis of the optical fibre unit. The inventors have indeed found that the optical fibres of the second group laid parallel to the longitudinal axis of the optical fibre unit advantageously allow to obtain a sheath with a substantially constant thickness and/or a substantially even surface more easily. The risk of depressions on the surface of the sheath during manufacturing of the optical fibre unit (in some scenarios, due to, among others, the sheath collapsing in the space between neighbouring optical fibres of the second group) is indeed reduced, in comparison to the case where the optical fibres of the second group are stranded or oscillated (SZ laid) about the resin layer.

In an embodiment, the annular space formed between the resin layer and the sheath contains a water blocking material, for example a grease or a gel, the second group of optical fibres being embedded in the water blocking material.

In an embodiment, the first group of optical fibres comprises at most 12 optical fibres.

In an embodiment, the resin layer has a diameter between 0.9 mm and 1.5 mm.

In an embodiment, the resin layer comprises at least one acrylate material.

According to an embodiment, the resin layer comprises a first layer of resin material, a second layer of resin material radially outer to the first layer of resin material and in direct contact thereto, the second layer of resin material having a secant modulus higher than a secant modulus of the first layer of resin material.

The secant modulus of the first layer may be between 0.5 MPa and 25 MPa, for example between 0.6 MPa and 10 MPa.

The secant modulus of the second layer may be between 500 MPa and 1000 MPa, for example between 600 MPa and 750 MPa.

In an embodiment, the sheath comprises a polyethylene as base polymer.

In an embodiment, the sheath may have a radial thickness between 100 μm and 250 μm, for example between 100 μm and 200 μm.

In an embodiment, the sheath has an inner diameter greater than the diameter of the resin layer. For example, the inner diameter of the sheath is at least equal to the resin layer diameter+300 μm.

According to a second aspect, the present disclosure provides a method for manufacturing an optical fibre unit for air-blown installation, the method comprising:

providing a first group of optical fibres;
  substantially completely embedding the first group of optical fibres in a resin layer;
  winding a second group of optical fibres about the resin layer; and
  providing a sheath in a radially outer position with respect to the resin layer so that an annular space is formed between resin layer and sheath, the second group of optical fibres being arranged in the annular space.

In an embodiment, the winding step can comprise a helical winding (Z- or S-lay) or an oscillating winding (SZ-lay).

In an embodiment, the method of the present disclosure comprises a step of providing a water blocking material about the resin layer, this step being carried out before or after the step of winding the second group of optical fibres.

In an embodiment, the step of providing a sheath in a radially outer position with respect to the resin layer comprises extruding the sheath, for example over the second group of optical fibres and, if present, the water blocking material.

According to a third aspect, the present disclosure provides an apparatus for manufacturing an optical fibre unit for air-blown installation, the apparatus comprising:

at least one resin applicator for applying at least one resin material on a first group of optical fibres and at least one curing device for curing the at least one resin material;
  a fibre guide for providing a second group of optical fibres about the resin material; and
  an extruder for forming a sheath around the second group of optical fibres.

In the present description and claims:

the term "radial" is used to indicate a direction perpendicular to a reference longitudinal axis of the optical fibre unit;
  the expressions "radially inner" and "radially outer" are used to indicate a position along a radial direction with respect to the above-mentioned longitudinal axis;
  a size along the radial direction is termed "thickness"; and
  the verb "to embed" means to enclose closely in or as if in a matrix.

The Shore hardness has been evaluated according to ISO 868 (2003 Mar. 1). The tensile strength, the elongation at break and the secant modulus have been evaluated according to ISO 527-1 (2012).

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the disclosure.

The present disclosure, in at least one of the aforementioned aspects, can be implemented according to one or more of the present embodiments, optionally combined together.

BRIEF DESCRIPTION OF DRAWINGS

The present disclosure will provide further particulars in the following detailed description, given by way of example and not of limitation, with reference to the following drawings, wherein.

DETAILED DESCRIPTION

Figure 1:
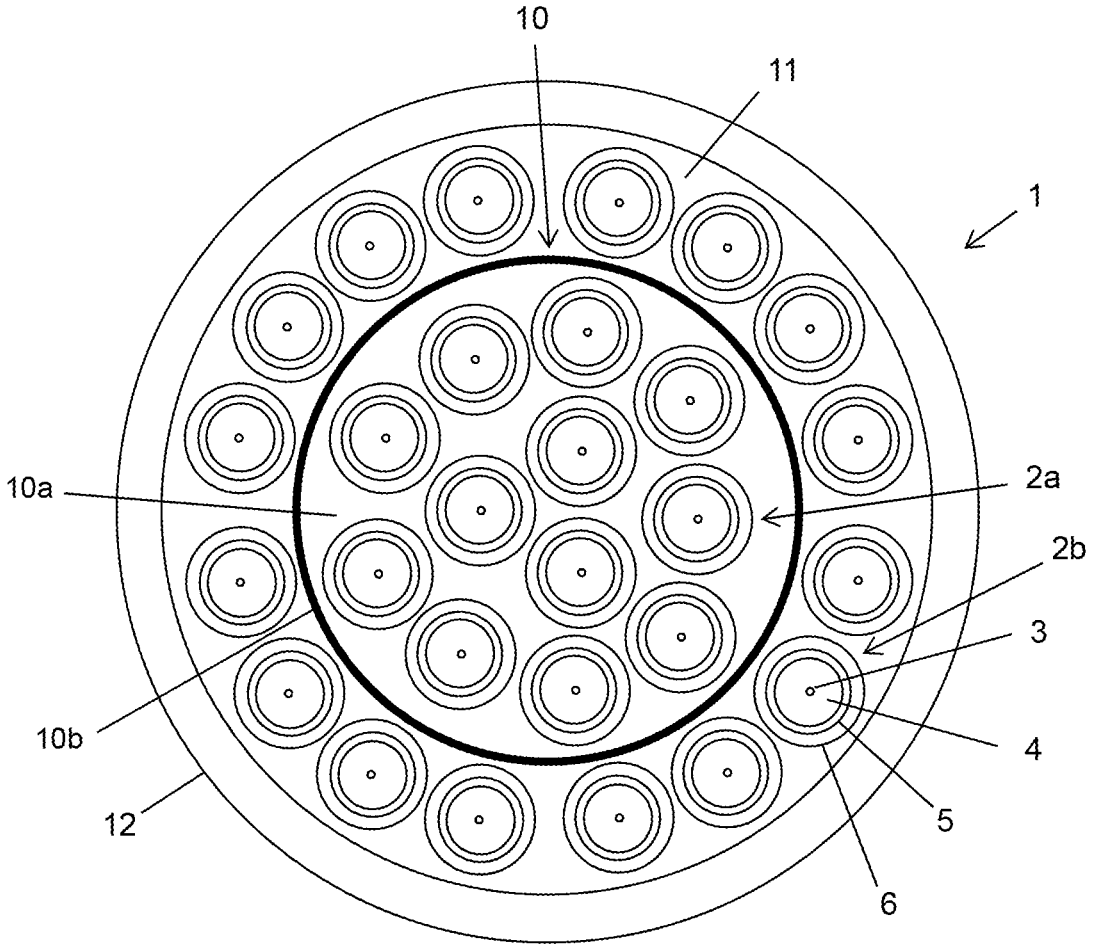
FIG. 1 shows a cross-section of an optical fibre unit for air-blown installation according to an embodiment of the present disclosure.

FIG. 1 shows a cross-section of an optical fibre unit 1 for air-blown installation according to an embodiment of the present disclosure. The unit 1 comprises a first group of optical fibres 2a, a resin layer 10, a second group of optical fibres 2b and a sheath 12.

Each optical fibre 2a, 2b comprises a glass core comprising an optical waveguide 3, for example a single mode optical waveguide, and a cladding 4 surrounding the waveguide 3. A first polymeric coating 5 surrounds the cladding 4 and a second polymeric coating 6, optionally coloured, surrounds the first polymeric coating 5. According to embodiments, each optical fibre 2 may further comprise a third polymeric coating (not shown in FIG. 1), for example an ink layer, surrounding the second polymeric coating 6.

Each optical fibre 2a, 2b can have a fibre outer diameter of from 150 μm to 300 μm, preferably from 180 μm to 250 μm. The outer diameter of the optical fibres 2a of the first group may be equal to or different from the outer diameter of the optical fibres 2b of the second group.

The optical fibres 2a of the first group may be arranged in a bundle. In an embodiment, the first group of optical fibres 2a comprises a maximum number $N_{max}$ of optical fibres 2a chosen so as to provide a central element—formed by first group of optical fibres 2a and resin layer 10—having a suitable stiffness for blowing installation. For example, the maximum number $N_{max}$ of optical fibres 2a in the first group may be equal to 12.

The resin layer 10 is a resin solid matrix which completely, or substantially completely, embeds the first group of optical fibres 2a. The resin layer 10 has an outer diameter between, for example, 0.9 mm and 1.5 mm, depending on the number of optical fibres 2a and their outer diameter. For example, with 12 optical fibres 2a having a fibre diameter ranging from 180 μm to 250 μm, the resin layer 10 has a diameter ranging from 0.96 mm to 1.3 mm.

The resin layer 10 may be made of a soft resin material which cushions the optical fibres 2a of the first group. The resin layer 10 may be made of a thermoplastic or thermosetting plastic material derived from acrylic acid, methacrylic acid or other related compounds. For example, the resin layer 10 comprises an acrylate resin. The acrylate resin of the resin layer 10 may be an ultraviolet (UV) curable acrylate resin.

According to an embodiment shown in FIG. 1, the resin layer 10 comprises at least two layers, namely an inner layer 10a and an outer layer 10b. The inner layer 10a and outer layer 10b may have different secant modulus, with the outer layer 10b having a secant modulus higher than the inner layer 10a. The low secant modulus of the inner layer 10a prevents transferring external forces acting on the unit 1 to the optical fibres 2a of the first group, while allowing easy removal from the optical fibres 2a without damaging them during installation in the field.

As "secant modulus" it is meant the slope of a line between the 0 point and a point at 2.5% strain in the stress-strain curve of the material under measurement, tested at 25° C. and 50% relative humidity.

In an embodiment, the secant modulus of the inner layer 10a is between 0.5 MPa and 25 MPa, for example between 0.6 MPa and 10 MPa, for example 1 MPa. Further, the secant modulus of the outer layer 10b may be between 500 MPa and 1000 MPa, for example between 600 MPa and 750 MPa, for example 668 MPa.

The inner layer 10a may have a diameter between about 50% and about 90% of the outer diameter of resin layer 10, for example about 85%. The inner layer 10a may substantially surround all the optical fibres 2a of the first group, so that there is at least some material with a thickness of about 1 μm to about 10 μm between two adjacent optical fibres 2a over the majority of the length.

In an embodiment, the resin of the inner layer 10a comprises a matrix material with a high elongation at break, for example higher than about 130%.

In an embodiment, the resin of the outer layer 10b comprises a hard, fast curing matrix material.

The sheath 12 of the optical fibre unit 1 is arranged radially outer to the resin layer 10. The inner diameter of the sheath 12 is larger than the outer diameter of the resin layer 10, so that a circumferential gap or annular space 11 is formed between the outer surface of the resin layer 10 and the inner surface of the sheath 12. In other words, the sheath 12 is conceived for not contacting the resin layer 10. For example, the sheath 12 may have an inner diameter at least equal to the sum of resin layer 10 diameter value (RLDV)+ 300 μm, for example from RLDV+360 μm to RLDV+600 μm.

The sheath 12 may be substantially coaxial with the resin layer 10, so that the annular space 11 has a substantially constant thickness.

The thickness of the sheath 12 may be between about 100 μm and 250 μm, for example between 100 μm and 200 μm.

The sheath 12 may be made of a polymer base material with low friction properties. For example, the polymer base material of the sheath is a thermoplastic polymer. For example, the polymer base material of the sheath is a polyethylene having a density of at least 0.925 g/cm³, for example from 0.928 to 0.940 g/cm³ (ISO 1183-1, 2004) and a hardness of at least than 50 Shore D (ISO 868, 2003).

The optical fibres 2b of the second group are arranged within the annular space 11 defined between the outer surface of the resin layer 10 and the inner surface of the sheath 12. The optical fibres 2b of the second group may be arranged about the resin layer 10 in at least one layer substantially coaxial with the resin layer 10. For example, as depicted in FIG. 1, all the optical fibres 2b of the second group are arranged about the resin layer 10 in a single layer substantially coaxial with the resin layer 10 itself. The optical fibres 2b of the second group may be stranded or oscillated about the resin layer 10. Alternatively, the optical fibres 2b of the second group may be laid about the resin layer 10 parallel to the longitudinal axis of the optical fibre unit 1.

The number of optical fibres 2b of the second group may range between 2 and 36, for example between 14 and 24. The number of optical fibres 2b of the second group that may be arranged about the inner layer 10 depends on both the outer diameter of the resin layer 10 and the fibre diameter of the optical fibres 2b of the second group.

In an embodiment, the annular space 11 formed between the outer surface of the resin layer 10 and the inner surface of the sheath 12 contains a water blocking material, like a grease or gel, in which the optical fibres 2b of the second group are embedded.

The optical fibre unit 1 exhibits a high fibre density, while preserving its blowing properties. Given a certain fibre count requested by the network operator, indeed, such fibre count may be suitably distributed between the first group of optical fibres 2a and the second group of optical fibres 2b. The number of optical fibres 2a in the first group may be kept below or equal to the maximum value $N_{max}$ (e.g. 12) which guarantees that the central element formed by first group of optical fibres 2a and the resin layer 10 exhibits a stiffness adequate for blowing installation.

The rest of the requested fibre count is instead arranged in the annular space 11 in one layer, or in more layers according to embodiments not specifically depicted herein, substantially coaxial with the resin layer 10, thereby forming the second group of optical fibres 2b. This arrangement of the second group of optical fibres 2b may be very compact and result in a reduced outer overall diameter of the optical fibre unit 1.

For example, by using different fibre diameters for the optical fibres 2a and 2b, optical fibre units for air-blown installation with different fibre counts and different diameters may be obtained, as set forth in Tables I-III herein below.

TABLE I

| diameter of fibres 2a = 250 μm, number of fibres 2a = 12 | | | |
|---|---|---|---|
| diameter of fibres 2b | 250 μm | 200 μm | 180 μm |
| number of fibres 2b | 18 | 24 | 28 |
| fibre count | 30 | 36 | 40 |
| unit overall diameter | 2.1 mm | 2.0 mm | 1.96 mm |

Table I shows fibre counts and diameters of three example optical fibre units similar to that of FIG. 1, comprising a first group of 12 optical fibres 2a having a fibre diameter of 250 μm. The resulting diameter of the resin layer 10 is 1.30 mm. Three different fibre diameters of 250 μm, 200 μm and 180 μm have been considered for the second group of fibres 2b. It may be appreciated that the number of fibres 2b of the second group that may be arranged about the resin layer 10 increases as the fibre diameter of the fibres 2b decreases. The overall diameter of the unit instead decreases as the fibre diameter of the fibres 2b decreases. The unit overall diameter values are obtained under the assumption that the thickness of the sheath 12 is 150 μm.

TABLE II

| diameter of fibres 2a = 200 μm, number of fibres 2a = 12 | | | |
|---|---|---|---|
| diameter of fibres 2b | 250 μm | 200 μm | 180 μm |
| number of fibres 2b | 16 | 18 | 20 |
| fibre count | 28 | 30 | 32 |
| unit overall diameter | 1.9 mm | 1.8 mm | 1.76 mm |

Table II shows fibre counts and diameters of three exemplary optical fibre units similar to that of FIG. 1, comprising a first group of 12 optical fibres 2a having a fibre diameter of 200 μm. The resulting diameter of the resin layer 10 in this case is 1.10 mm. Due to the lower diameter of the resin layer 10 in comparison to the case of Table I, the number of fibres 2b that may be arranged about the resin 10 is accordingly decreased. Lower fibre counts and lower unit overall outer diameters are accordingly obtained.

TABLE III

| diameter of fibres 2a = 180 μm, number of fibres 2a = 12 | | | |
|---|---|---|---|
| diameter of fibres 2b | 250 μm | 200 μm | 180 μm |
| number of fibres 2b | 14 | 16 | 18 |
| fibre count | 26 | 28 | 30 |
| unit overall diameter | 1.76 mm | 1.66 mm | 1.62 mm |

Table III shows fibre counts and diameters of three exemplary optical fibre units similar to that of FIG. 1, comprising a first group of 12 optical fibres 2a having a fibre diameter of 180 μm. The resulting diameter of the resin layer 10 in this case is 0.96 mm. Due to the lower diameter of the resin layer 10 in comparison to the cases of Tables I and II, the number of fibres 2b that may be arranged about the resin 10 is accordingly decreased. Still lower fibre counts and lower unit overall outer diameters are accordingly obtained.

Figure 2:
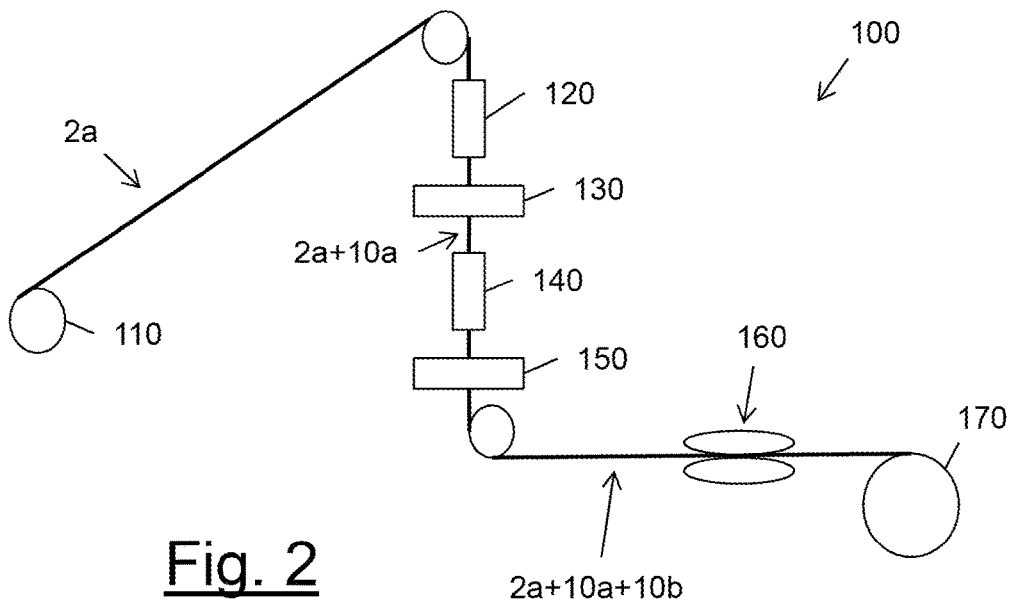
FIGS. 2 and 3 schematically show an apparatus for manufacturing the optical fibre unit according to an embodiment of the present disclosure.
Figure 3:
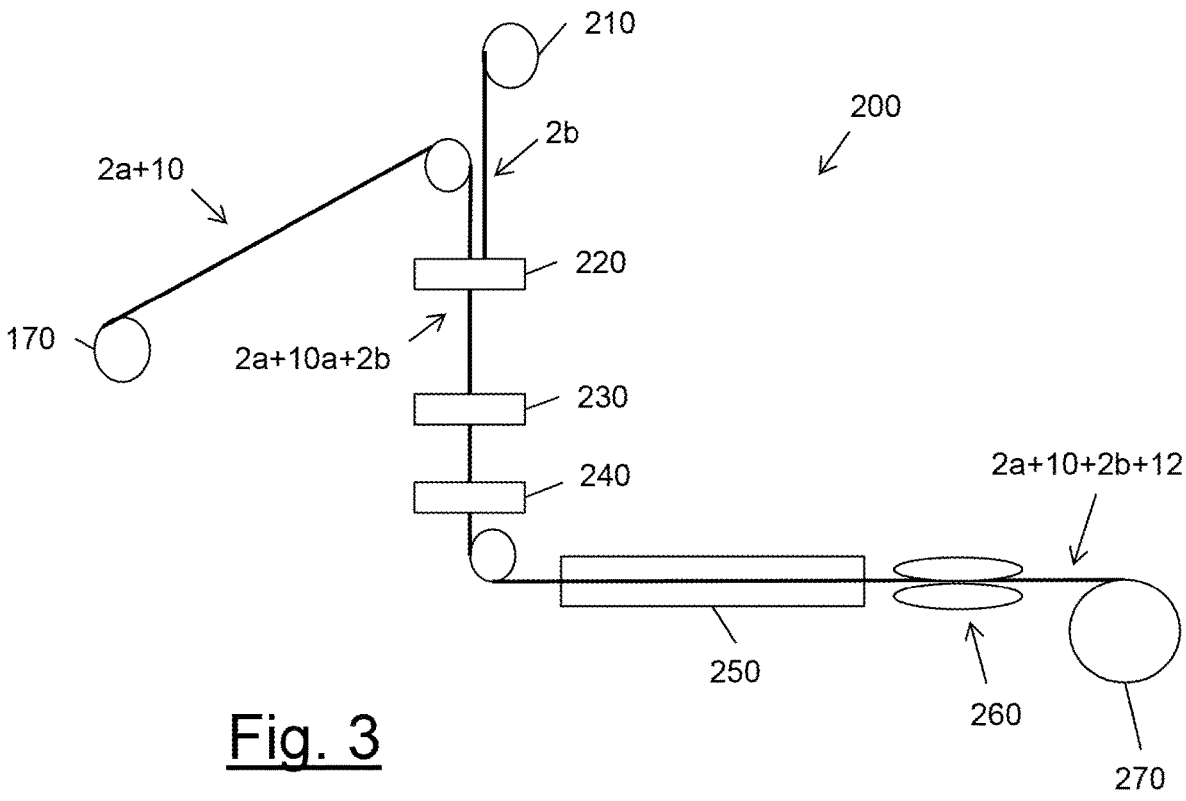

With reference to FIGS. 2 and 3, an apparatus for manufacturing the optical fibre unit 1 according to an embodiment of the present disclosure will be described in detail.

The apparatus comprises a first stage and a second stage cascaded thereto.

The first stage 100, shown in FIG. 2, is configured to manufacture the resin layer 10 with the first group of optical fibres 2a embedded therein.

In the first stage 100, a number of optical fibres 2a are unwound from a corresponding number of bobbins 110. According to an embodiment of the disclosure, the optical fibres 2a are passed through a first resin applicator 120 for applying the inner layer 10a of resin. After the first resin applicator 120, a first curing source 130 is provided. Such first curing source 130 could comprise a UV lamp or the like for curing the inner layer of resin 10a.

As shown in FIG. 2, a second applicator 140 for applying the outer layer 10b of resin may be provided and followed by a second curing source 150. Such second curing source 150 could comprise a UV lamp or the like for curing the layer of resin 10b.

The first stage 100 of the apparatus could also comprise a capstan 160 before a take-up station 170.

The second stage 200 of the apparatus, shown in FIG. 3, is configured to provide the second group of optical fibres 2b and the sheath 12 onto the resin layer 10 with the first group of optical fibres 2a provided by the first stage 100.

In the second stage 200, a number of optical fibres 2b are unwound from a corresponding number of bobbins 210 and are wound (helically or oscillated) about the resin layer 10 through a fibre guide 220. Then, the resin layer 10 with fibres 2a embedded therein and fibres 2b arranged about may be passed through a tip 230, which injects the water blocking material onto the fibres 2b, so that the water blocking material can penetrate amongst the fibres 2b and possibly embed them. Alternatively, the tip 230 may be provided upwards the fibre guide 220, so that the water blocking material is provided about the resin layer 10 before the winding of the fibres 2b thereon. The collection of resin layer 10, fibres 2b and, optionally, water blocking material is then passed through an extruder 240, which extrudes the sheath 12 upon the fibres 2b and, optionally, water blocking material. The optical fibre unit is then passed through a cooling trough 250.

Finally, a capstan 260 and a take-up arrangement 270 can be provided.

The invention claimed is:

1. An optical fibre unit for air-blown installation comprising:
   a first group of optical fibres;
   a resin layer substantially completely embedding the first group of optical fibres;
   a sheath arranged in a radially outer position with respect to the resin layer so that an annular space is formed between resin layer and sheath;
   a water blocking material in the annular space; and
   a second group of optical fibres arranged in the annular space, the optical fibres of the second group of optical fibres being laid about the resin layer and each substantial parallel to a longitudinal axis of the optical fibre unit, the second group of optical fibres each being completely embedded in the water blocking material.

2. The optical fibre unit according to claim 1, wherein the second group of optical fibres is arranged about the resin layer in at least one layer substantially coaxial with the resin layer.

3. The optical fibre unit according to claim 1, wherein the annular space formed between the resin layer and the sheath is filled with a water blocking material, the second group of optical fibres being embedded in the water blocking material.

4. The optical fibre unit according to claim 1, wherein the first group of optical fibres comprises at most 12 optical fibres.

5. The optical fibre unit according to claim 1, wherein the resin layer has a diameter between 0.9 mm and 1.5 mm.

6. The optical fibre unit according to claim 1, wherein the resin layer comprises at least one acrylate material.

7. The optical fibre unit according to claim 1, wherein the resin layer comprises a first layer of resin material and a second layer of resin material radially outer to the first layer of resin material, wherein the second layer of resin material has a secant modulus higher than a secant modulus of the first layer of resin material.

8. The optical fibre unit according to claim 7, wherein the secant modulus of the first layer is between 0.5 MPa and 25 MPa.

9. The optical fibre unit according to claim 7, wherein the secant modulus of the second layer is between 500 MPa and 1000 MPa.

10. The optical fibre unit according to claim 1, wherein the sheath comprises a polyethylene as base polymer.

11. The optical fibre unit according to claim 1, wherein the sheath has a radial thickness between 100 μm and 250 μm.

12. The optical fibre unit according to claim 1, wherein the water blocking material is gel.

13. The optical fibre unit according to claim 1, wherein the water blocking material is grease.

14. A method for manufacturing an optical fibre unit for air-blown installation, the method comprising:

providing a first group of optical fibres;

substantially completely embedding the first group of optical fibres in a resin layer;

arranging a second group of optical fibres about the resin layer, the optical fibres of the second group of optical fibres being laid about the resin layer and each substantial parallel to a longitudinal axis of the optical fibre unit;

providing a sheath in a radially outer position with respect to the resin layer so that an annular space is formed between the resin layer and the sheath, the second group of optical fibres being arranged in the annular space; and providing a water blocking material in the annular space, the second group of optical fibres each being completely embedded in the water blocking material.

15. The method of claim 14, comprising providing a water blocking material about the resin layer.

16. The method of claim 15, wherein the providing the water blocking material is carried out before the arranging the second group of optical fibres.

17. The method of claim 15, wherein the providing the water blocking material is carried out after the arranging the second group of optical fibres.

18. An optical fibre unit for air-blown installation comprising:

a first group of optical fibres;

a resin layer substantially completely embedding the first group of optical fibres;

a sheath arranged in a radially outer position with respect to the resin layer so that an annular space is formed between resin layer and sheath, wherein the sheath is substantially coaxial with the resin layer and the annular space has a substantially constant thickness; and a second group of optical fibres arranged in the annular space, the optical fibres of the second group of optical fibres being laid about the resin layer, the second group of optical fibres each being completely embedded in a water blocking material within the annual space.

* * * * *